United States Patent
Kim

(12) United States Patent (10) Patent No.: US 7,581,840 B2
(45) Date of Patent: Sep. 1, 2009

(54) FOCUS REGULATOR AND PROJECTION APPARATUS HAVING SAME

(75) Inventor: Min-Chul Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 588 days.

(21) Appl. No.: 11/259,206

(22) Filed: Oct. 27, 2005

(65) Prior Publication Data

US 2006/0203211 A1 Sep. 14, 2006

(30) Foreign Application Priority Data

Mar. 9, 2005 (KR) .................. 10-2005-0019666

(51) Int. Cl.
*G03B 21/14* (2006.01)
*G02B 7/04* (2006.01)

(52) U.S. Cl. ..................... 353/101; 359/825

(58) Field of Classification Search ............. 353/100, 353/101; 359/819, 822, 823, 825
See application file for complete search history.

(56) References Cited

U.S. PATENT DOCUMENTS

| 4,822,153 | A | * | 4/1989 | Tomori et al. ............... 359/700 |
| 5,587,843 | A | * | 12/1996 | Chen ......................... 359/700 |
| 7,054,073 | B2 | * | 5/2006 | Shirie ........................ 359/699 |
| 2001/0015861 | A1 | * | 8/2001 | Sasaki ........................ 359/826 |
| 2002/0154276 | A1 | * | 10/2002 | Narimatsu et al. ............ 353/31 |

FOREIGN PATENT DOCUMENTS

| JP | 62-189451 | 8/1987 |
| JP | 01-191814 | 8/1989 |
| KR | 1020040076050 | 8/2004 |

* cited by examiner

*Primary Examiner*—William C. Dowling
(74) *Attorney, Agent, or Firm*—Roylance, Abrams, Berdo & Goodman, LLP.

(57) ABSTRACT

A focus regulator is provided for simplifying and minimizing the structure of an image projector. The focus regulator includes a controller rotatably formed on a main body to be limitedly movable in the direction of the optical axis. A focus lens unit is affixed to the projection lens unit of the main body to be movable in the direction of the optical axis (OX) by being rotated with the controller.

5 Claims, 4 Drawing Sheets

FOCUS REGULATOR AND PROJECTION APPARATUS HAVING SAME

CROSS-REFERENCE TO RELATED APPLICATIONS

This application claims the benefit under 35 U.S.C. § 119(a) of Korean Patent Application No. 2005-19666, filed Mar. 9, 2005, in the Korean Intellectual Property Office, the entire disclosure of which are hereby incorporated by reference.

BACKGROUND OF THE INVENTION

1. Field of the Invention

The present invention relates to a projection apparatus, such as a projector. More specifically, the present invention relates to a focus regulator of a projection apparatus for adjusting the focus of an image projected onto a screen.

2. Description of the Related Art

Conventionally, a projection apparatus is a displaying device designed for enlarging and projecting an optical image generated from an image formation unit onto a projection surface, such as a screen.

The projection apparatus generally includes an illuminating optical system for generating light, an image formation unit for converting the light generated by the illuminating optical system into an optical image, and a projection system for enlarging and projecting the optical image converted by the image formation unit onto a projection surface. Additionally, the projection system includes a first lens unit for an incident optical image generated by the image formation unit, and a second lens unit for projecting an optical image passing through the first lens unit onto a projection surface.

Additionally, the projection apparatus includes a focus regulator for adjusting the focus of the optical image enlarged and projected onto the projection surface. The focus regulator adjusts the focus of the optical image by changing the interval between the first and second lens units.

A conventional focus regulator includes a controller protruding outside of a main body of the projection apparatus for easy controlling by a user, and a power transmission unit for transmitting power from the controller to the first lens unit. Operation of the focus regulator having the above configuration is started by a user rotating the controller. Then, the rotation of the controller is transmitted by the power transmission unit and causes a rotation of the first lens unit. The first lens unit moves in the direction of the optical axis of the optical image by the rotation. The movement of the first lens in the direction of the optical axis adjusts the interval between the first and second lens units, thereby adjusting the focus of the projected image. Additionally, the controller moves in the direction of the optical axis together with the first lens unit.

However, when the controller moves in the direction of the optical axis, additional space inside the projection apparatus is necessary for accommodating the movement of the controller. In particular, because the controller is protruded outside of a main body of the projection apparatus for easy controlling by a user, a design for assuring the necessary space becomes more difficult. Additionally, providing this space hinders minimization of the projection apparatus.

In particular, as the demand for a portable projection apparatus increases, developing a focus regulator having a simple structure and being advantageous to the minimization of the apparatus also becomes necessary.

Additionally, as the importance of the design for the projection apparatus grows, a mask, fixedly installed on a main body of the projection apparatus, is used for covering the front of the main body. However, when the focus regulator described above is used, designing the mask is difficult as it should not restrict movement of the controller back and forth.

Accordingly, a need exists for an improved projection apparatus having a focus regulator while minimizing the size of the projection apparatus.

SUMMARY OF THE INVENTION

An object of the present invention is to provide a focus regulator that minimizes the size of a projection apparatus and a projection apparatus having the same.

Additionally, another object of the present invention is to provide a focus regulator that simplifies the product design and a projection apparatus having the same.

According to one aspect of the present invention, a focus regulator includes a controller rotatably installed on a main body that is limited to movement in the direction of the optical axis (OX), and a focus lens unit affixed with a projection lens unit of the main body that are movable in the direction of the optical axis by rotating them together with the controller.

According to one exemplary embodiment of the present invention, the controller includes a ring-shaped body having an inner portion in which one end of the focusing lens unit is inserted, and at least one power transmission rib elongated and protruding from the body in the direction of the focus lens unit. Additionally, the focus lens unit includes a focus ring affixed to the power transmission rib in a manner that transmits rotary power. A focus lens barrel has at least one lens therein and fixes the focus ring. Additionally, a plurality of protrusions are formed at a certain interval on the outer circumference of the focus ring, and the power transmission rib is inserted between the protrusions. With this configuration, the controller is affixed with the focus lens unit, such that the focus lens unit moves in the direction of the optical axis (OX).

Preferably, the focus lens unit is affixed to the projection lens unit using screws. Additionally, the main body has a base supporting the projection lens unit, a cover installed on the base that has an opening for inserting one end of the controller, and a mask installed on the cover to cover the opening-sided surface of the cover and that has an opening for inserting the other end of the controller. The movement of the controller in the direction of the optical axis (OX) is limited by means of the cover and the mask.

An object of the present invention may also be achieved by a projection apparatus having a main body, and an illuminating optical system formed on the main body for generating and emitting light. An image formation unit formed on the main body for converts the light emitted by the illuminating optical system into an optical image. A projection lens unit receives the optical image converted by the image formation unit. A focus lens unit is movably affixed to the projection lens unit in the direction of the optical axis (OX). A controller rotatably installed on the main body is limited to movement in the direction of the optical axis (OX) for transmitting rotary power to the focus lens unit.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

The above aspects and features of the present invention will be more apparent by describing certain exemplary embodiments of the present invention with reference to the accompanying drawings, in which.

Throughout the drawings, like reference numerals will be understood to refer to like parts, components and structures.

DETAILED DESCRIPTION OF EXEMPLARY EMBODIMENTS

Certain exemplary embodiments of the present invention are described in greater detail with reference to the accompanying drawings.

Figure 1:
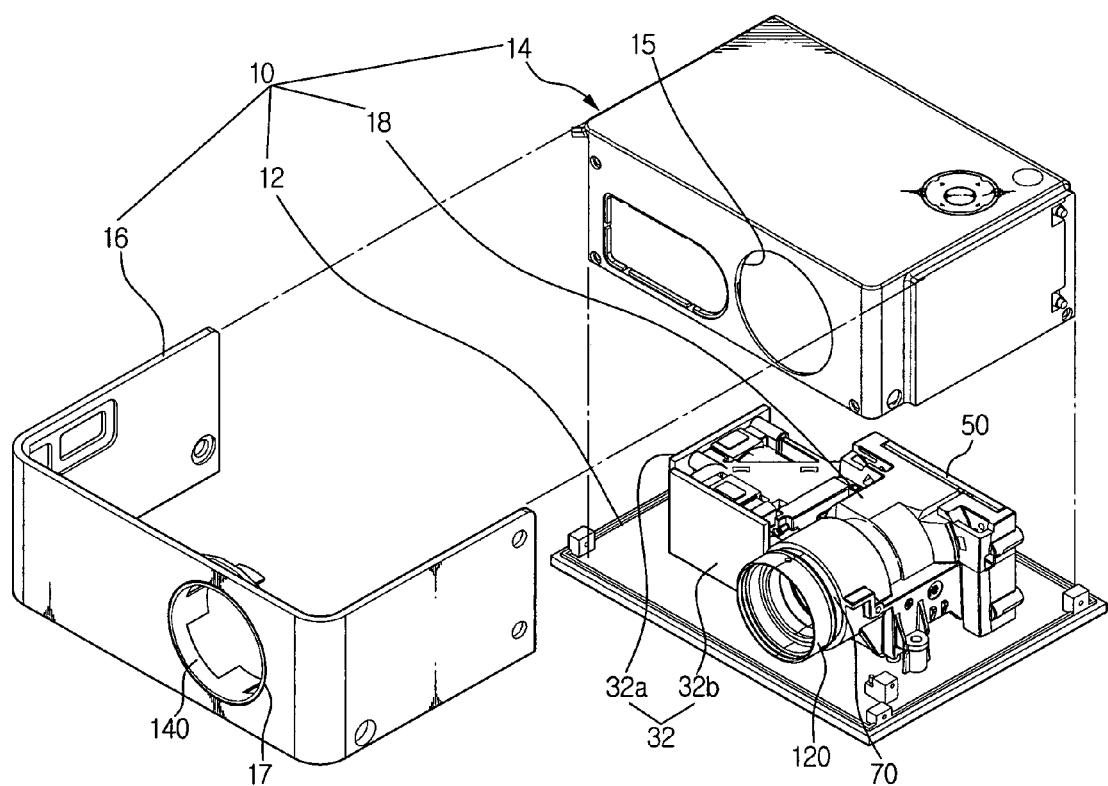
FIG. 1 is an exploded perspective view of a projection apparatus according to an exemplary embodiment of the present invention.
Figure 2:
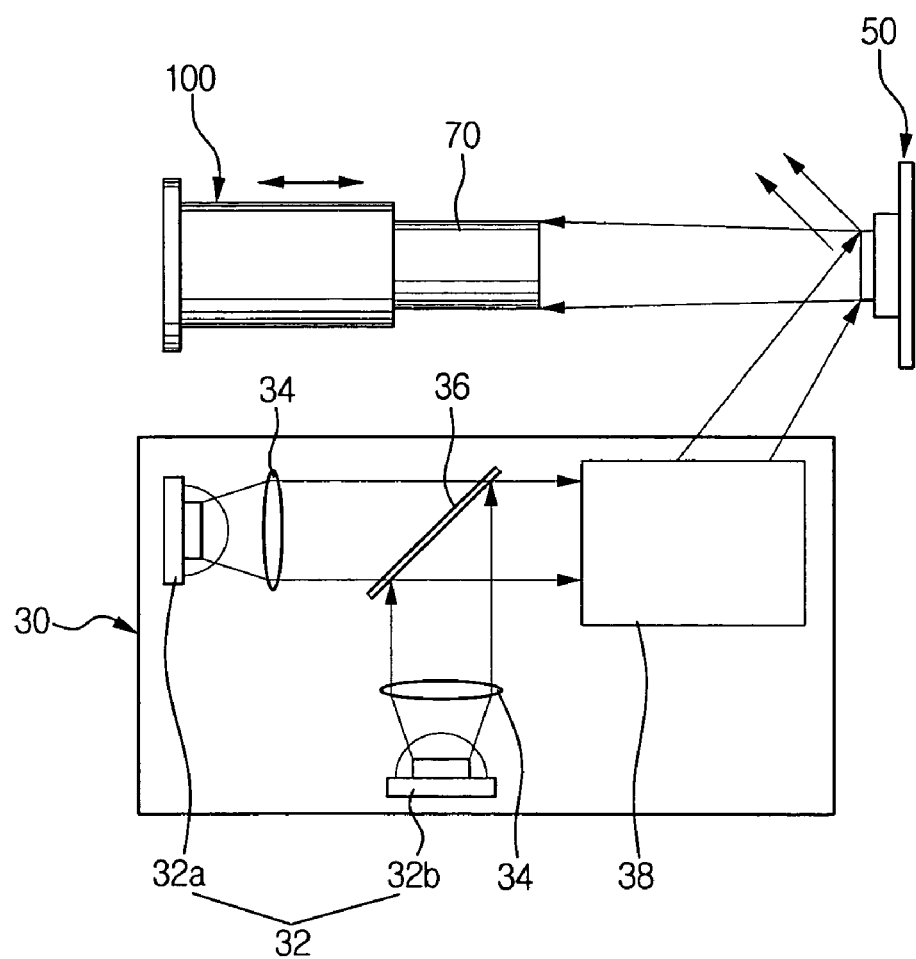
FIG. 2 is a schematic diagram showing the operation of the projection apparatus of FIG. 1.

Referring to FIGS. 1 and 2, the projection apparatus according to one exemplary embodiment of the present invention includes a main body 10, an illuminating optical system 30, an image formation unit 50, a projection lens unit 70, and a focus regulator 100.

The main body 10 includes a base 12, a cover 14, a mask 16, and a case 18.

The base 12 forms the bottom plane of the projection apparatus and supports the illuminating optical system 30, image formation unit 50, projection lens unit 70 and focus regulator 100.

The cover 14 is affixed to the base 12 for covering each part. An opening 15 is formed in the front of the cover 14 for passing the focus regulator 100 therethrough when it advances to adjust the focus.

The mask 16 is preferably fixed using screws or the like at both sides of the cover 14 to cover both sides and the front of the cover 14. An opening 17 corresponding to the opening 15 at the front of the cover 14 is formed at the front of the mask. The focus regulator 100 passes through the opening 17 in addition to the opening 15 formed in the cover 14 when the focus regulator advances. As illustrated in FIG. 2, a controller 140 of the focus regulator 100 is rotatably formed between the mask 16 and the cover 14. Details of the focus regulator are described below.

The case 18 houses the above parts and is fixed to the base 12, preferably using screws or the like. The case 18 forms a module for the parts and may be omitted when each part is fixed to the base 12.

The illuminating optical system 30 includes a light source 32, a collimating lens 34, a dichroic filter 36, and a relay lens unit 38.

The light source 32 includes a first light source 32a for irradiating blue and red light, and a second light source 32b for generating green light. A light emitting diode (LED) light source is preferably used as the first and second light sources 32a and 32b for minimizing the projection apparatus, but a halogen lamp, an ultra-high performance (UHP) lamp, or the like may also be used.

The collimating lens 34 converts the light emitted from the first and second light sources 32a and 32b into parallel light, as shown in FIG. 2.

The light is permeated or reflected by means of the dichroic filter 36 according to its wavelength. That is, by means of the dichroic filter 36, red and blue light are permeated and green light is reflected. Therefore, light emitted from the first light source 32a is permeated and incident on the relay lens unit 38. Additionally, light projected from the second light source 32b is reflected and incident on the relay lens unit 38.

The relay lens unit 38 plays a role not only in uniformly standardizing the density of the light emitted from the dichroic filter, but also in collecting the light into a rectangular shape and emitting it to the image formation unit 50.

The image formation unit 50 converts incident light from the relay lens unit 38 into an image in accordance with an image signal. A CRT (Cathode Ray Tube), an LCD (Liquid Crystal Display), a DMD (Digital Micromirror Device), and the like may be used as the image formation unit 50, and the DMD is currently widely used as an image formation unit. The DMD consists of a plurality of independently rotatable mirrors that selectively reflect light emitted from the relay lens unit 38 to the projection lens unit 70, thereby forming an image.

The projection lens unit 70 is mounted inside the case 18 and receives the incident optical image generated from the image formation unit 50. A plurality of lenses are arranged inside the projection lens unit 70, and enlarge the optical image and compensate for various aberrations in the optical image. A screw thread 70a, shown in FIG. 3, is formed inside the projection lens unit 70.

Figure 3:
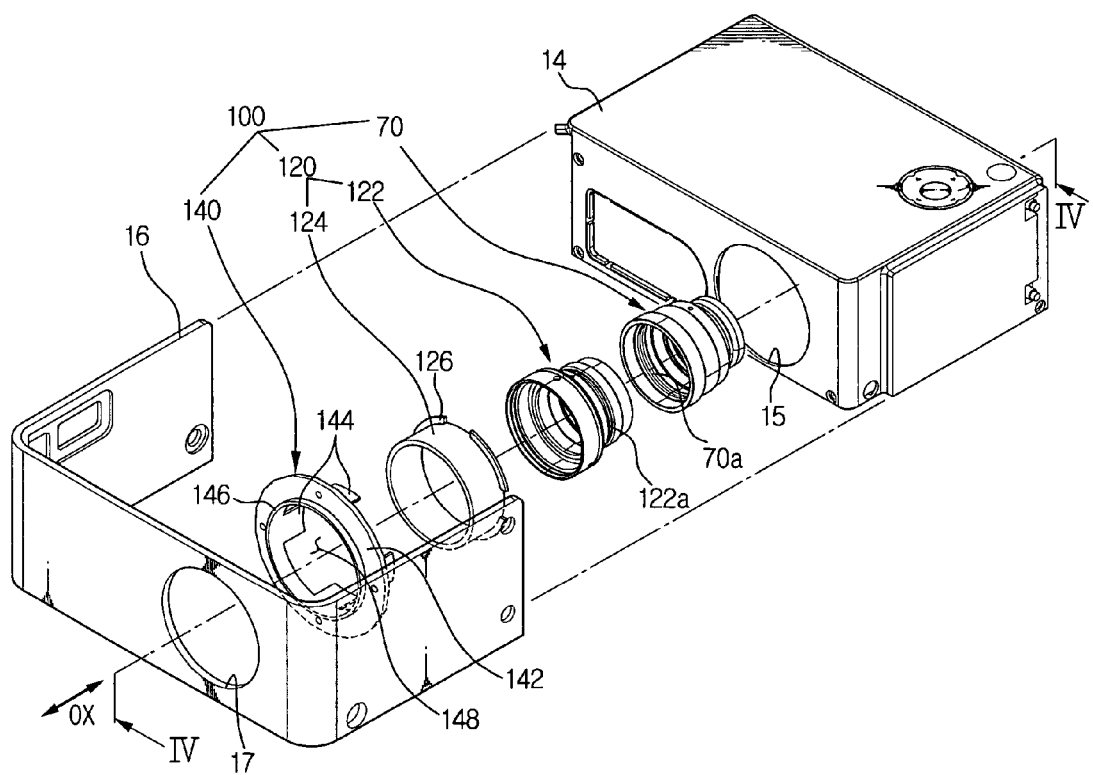
FIG. 3 is a further exploded perspective view of the projection apparatus of FIG. 1.

Referring to FIG. 3, the focus regulator 100 includes a focus lens unit 120 and a controller 140.

The focus lens unit 120 includes a focus lens barrel 122 and a focus ring 124.

A screw thread 122a corresponding to the screw thread 70a of the projection lens unit 70 is formed on the outer circumference of the focus lens barrel 122. The focus lens barrel 122 is inserted inside of the projection lens unit 70 and affixed therein by means of the screw threads 70a and 122a. Therefore, when the focus lens barrel 122 rotates, it moves linearly from the projection lens unit 70 in the direction of the optical axis (OX). Alternatively to the combination of the focus lens barrel 122 and the projection lens unit 70 using the screw thread, other combination means, such as a cam protrusion or a cam groove, may be used if a rotation of the focus lens barrel 122 results in movement in the direction of the optical axis of an optical image. At least one lens is arranged inside the focus lens barrel 122, and adjusting the focus of the image projected onto a projection surface may be achieved by adjusting the distance between the lens in the focus lens barrel 122 and the lens in the projection lens unit 70.

A portion of the focus lens barrel 122 is inserted into the focus ring 124, and the focus ring 124 is fixed to the focus lens barrel 122 by fixing the inserted portion of the focus lens barrel 122 preferably using screws or the like. Additionally, at least one protrusion 126 is formed on the focus ring 124.

The controller 140 includes a ring-shaped body 142, at least one power transmission rib 144 protruding from the body 142 in the direction of the focus ring 124, and a ring-shaped supporting rib 146 formed on the ring-shaped body 142 and protruding from the body in the direction of the mask, which is in a direction substantially opposite to the at least one power transmission rib 144.

The ring-shaped body 142 has a small diameter opening 148 in a central portion for passing the focus ring 124 therethrough. Therefore, the focus ring 124 moves linearly in the direction of the optical axis by passing through the opening 148 in the focus ring 124.

The power transmission rib 144 is inserted between the protrusions 126. Therefore, if the controller 140 rotates, the rotary power of the controller 140 is transmitted to the focus ring 124 through the power transmission rib 144 and the protrusions 126. Additionally, by rotating the focus ring 124, the focus lens barrel 122 moves linearly from the projection lens unit 70 in the direction of the optical axis. However, the movement of the controller 140 in the direction of the optical axis is limited because it is placed between the cover 14 and the mask 16. Therefore, the focus ring 124 performs a sliding movement in the opening 148 of the controller 140 along the power transmission rib 144 in the direction of the optical axis. Likewise, the rotary power of the controller 140 may be transmitted to the focus lens unit 120 by the simple structure of the power transmission rib 144 and the protrusions 126. This configuration has the benefit of minimizing the projection apparatus. In particular, because the focus ring 124 slides on the controller 140 while being inserted between the power transmission rib 144 and the protrusions 126, the controller 140 hardly receives a force acting in the direction of the optical axis, and has limited movement in the direction of the optical axis by means of the cover 14 and the mask 16. Therefore, additional space for the movement of the controller 144 is not necessary, which is thereby more advantageous in minimizing the size of projection apparatus.

When the protrusions 126 are formed on the focus lens barrel 122, the focus ring 124 may be omitted. Additionally, according to one exemplary embodiment of the present invention, the cover 14 and the mask 16 limit the movement of the controller 140 in the direction of the optical axis. Alternatively, the power transmission rib 144 of the controller 140 may be elongated and protruding from the projection lens unit 70 so that the projection lens unit 70 limits the movement of the power transmission rib 144 in the direction of the optical axis. For example, a groove and a protrusion are formed on the projection lens unit 70 respectively in the circumferential direction and at one end of the power transmission rib 144, and the protrusion rotates while being inserted into the groove so that the movement of the controller 140 in the direction of the optical axis may be limited when hooked to the groove.

Meanwhile, according to one exemplary embodiment of the present invention, the projection lens unit 70 is an exemplary frame affixed to the focus lens barrel 122 using screws. Alternatively, the frame may be formed as a separate part affixed with the main body 10. Additionally, the power transmission rib 144 of the controller 140 may be rotatably formed while having limited movement in the direction of the optical axis by forming a groove on the frame and elongating the power transmission rib 144 relative to the frame.

The supporting rib 146 is inserted in the opening 17 of the mask 16, and rotatable while allowing limited movement of the controller 140 in the direction of the optical axis (OX).

Figure 4A:
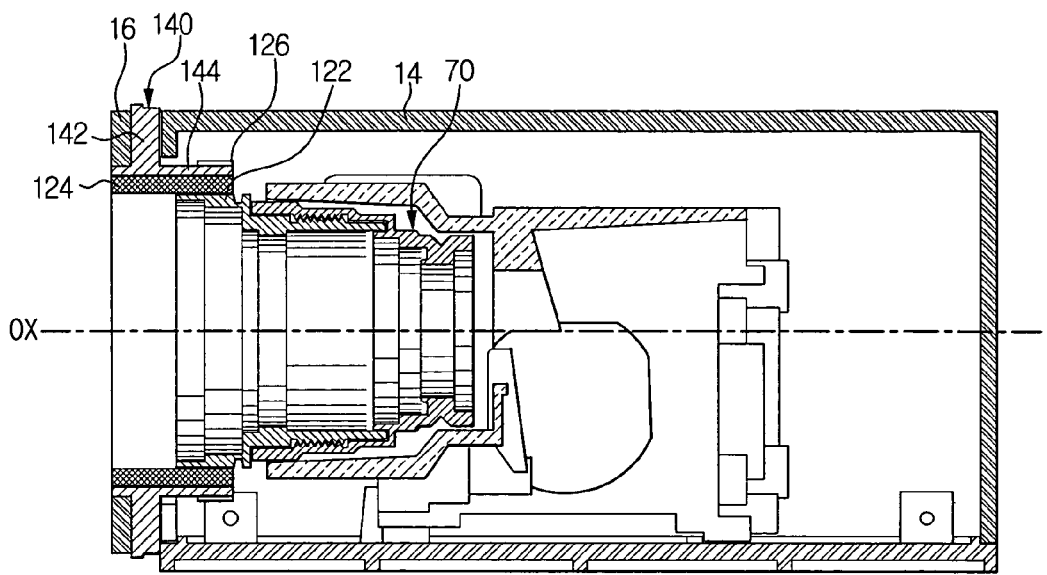
FIGS. 4A and 4B are elevational views in cross section according to line IV-IV of FIG. 3 illustrating the operation of the projection apparatus of an exemplary embodiment of the present invention.
Figure 4B:
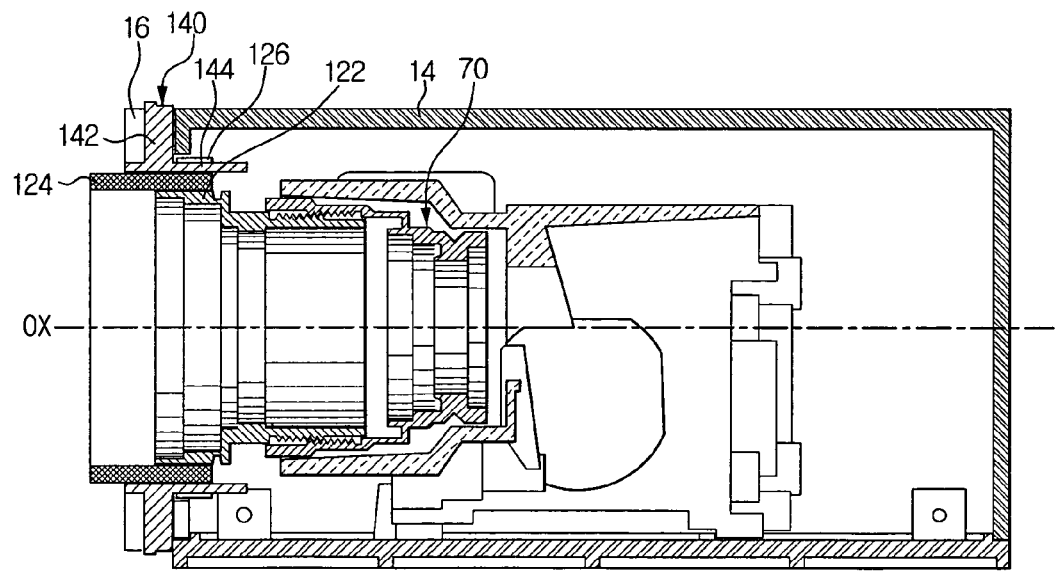

Hereafter, referring to FIGS. 4A and 4B, operation according to one exemplary embodiment of the present invention is described.

First, light generated by the illuminating optical system 30, shown in FIG. 2, is converted to an optical image by the image formation unit 50, shown in FIG. 2. Additionally, the optical image passes through the projection lens unit 70 and the focus regulator 100, and is projected onto a screen. Additionally, a user adjusts the controller 140 to focus the image projected onto the screen.

At this time, the user rotates the controller 140 protruding from the cover 14 and the mask 16. By rotating the controller 140, the power transmission rib 144 of the controller 140 transmits the power to the protrusions 126 of the focus ring 124 and rotates the focus ring 124. Additionally, when the focus ring 124 rotates, the focus lens barrel 122 fixed to the focus ring 124 also rotates. Additionally, the focus lens barrel 122, which is preferably affixed to the projection lens unit 70 using screws, moves linearly from the projection lens unit 70 in the direction of the optical axis (OX).

At this time, because the movement of the controller 140 in the direction of the optical axis (OX) is limited by the mask 16 and the cover 14, the focus ring 124 moves in the direction of the optical axis by sliding into the power transmission rib 144. Likewise, minimizing the projection apparatus is possible by limiting the movement of the controller 140 in the direction of the optical axis (OX), and the design restrictions are reduced without limiting the shape of the mask 16. Additionally, the focus lens barrel 122 and the focus ring 124 pass through the opening 148 of the controller 140, shown in FIG. 3, and hole 15, 17 of the cover 14 and the mask 16, shown in FIG. 3, when they move linearly.

As described above, according to the present invention, a power transmission structure between the controller and the focus lens unit is simplified, which is advantageous in minimizing the size of the projection apparatus.

In particular, the focus lens unit moves in the direction of the optical axis (OX) without movement of the controller in the direction of the optical axis (OX), which is more advantageous in minimizing the size of the projection apparatus. Additionally, design restrictions may be reduced because mounting an accessory, such as the mask, is made easy.

The foregoing embodiments and advantages are merely exemplary and are not to be construed as limiting the present invention. The present teachings may be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A projection apparatus, comprising:
    a main body;
    an illuminating optical system formed on the main body that generates and emits light;
    an image formation unit formed on the main body that converts the light emitted by the illuminating optical system into an optical image;
    a projection lens unit that receives the optical image converted by the image formation unit;
    a focus lens unit affixed to the projection lens unit and adapted to move in a direction of an optical axis (OX) when rotated; and
    a controller rotatably formed on the main body that transmits rotary power to the focus lens unit and is adapted not to move in the direction of the optical axis (OX),
    wherein the controller includes a ring-shaped body into which one end of the focus lens unit is selectively inserted in an inner portion thereof,
    wherein the main body includes
        a base that supports the projection unit;
        a cover formed on the base and having an opening for inserting a first end of the controller; and
        a mask formed on the cover to cover a side of the cover in which the cover opening is formed and having a mask opening adapted to receive a second end of the controller, the controller having limited movement in a direction of an optical axis (OX) by means of the cover and the mask.

2. The projection apparatus as claimed in claim 1, wherein the controller includes
    at least one power transmission rib elongated and extending from the body toward the focus lens unit.

3. The projection apparatus as claimed in claim 2, wherein the focus lens unit includes a focus ring affixed to the power transmission rib to transmit rotary power therebetween; and a focus lens barrel fixed to the focus ring and having at least one lens inside thereof.

4. The projection apparatus as claimed in claim 3, wherein a plurality of protrusions are formed on an outer circumference of the focus ring in a circumferential direction, and the power transmission rib is inserted between adjacent protrusions.

5. The projection apparatus as claimed in claim 1, wherein the focus lens unit is affixed to the projection lens unit with screws.

* * * * *

UNITED STATES PATENT AND TRADEMARK OFFICE
CERTIFICATE OF CORRECTION

PATENT NO.        : 7,581,840 B2                                    Page 1 of 1
APPLICATION NO.   : 11/259206
DATED             : September 1, 2009
INVENTOR(S)       : Min-Chul Kim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 897 days.

Signed and Sealed this

Fourteenth Day of September, 2010

David J. Kappos
*Director of the United States Patent and Trademark Office*